Patented Mar. 18, 1952

2,589,937

UNITED STATES PATENT OFFICE 2,589,937

MANUFACTURE OF NEW BASIC ESTERS OF 1-ARYL-CYCLOPENTANE-1-MONOTHIO-CARBOXYLIC ACIDS

Franz Häfliger, Henry Martin, and Rolf Denss, Basel, Switzerland, assignors to J. R. Geigy A.-G., Basel, Switzerland No Drawing. Application May 17, 1948, Serial No. 27,604. In Switzerland May 23, 1947

9 Claims. (Cl. 260—455)

This invention relates to the manufacture of basic esters of 1-aryl-cyclopentane-1-monothiocarboxylic acids and their salts and aims to furnish new compounds as hereinafter defined having valuable therapeutic properties.

According to one feature of the present invention we provide new basic esters of 1-aryl-cyclopentane-1-monothiocarboxylic acids of the general Formula I:

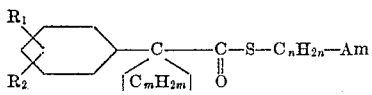

wherein $R_1$ and $R_2$ each mean a hydrogen atom, a methyl or a methoxy group, $n$ means an integer from 2 to 6 inclusive, $m$ means an integer at least 4, and Am means the radical of a secondary aliphatic, cycloaliphatic or heterocyclic amine (and their salts and quaternary salts) which possess valuable therapeutic properties and which are prepared by the methods hereinafter particularly described and ascertained or by their obvious chemical equivalents. In the above definition of the general formula of the new basic esters, the expression secondary, heterocyclic amine signifies heterocyclic compounds containing an endocyclic —NH-group such as, e. g. piperidine or morpholine.

The invention also includes the methods of making such compounds hereinafter described.

The invention is more particularly concerned with the cyclopentane compounds, i. e. those of general Formula I wherein $m$ is 4.

Another object of the invention is to provide new compositions which have been found to possess desirable therapeutic properties. Broadly speaking the compounds according to the invention are valuable spasmolytics. More particularly, from the therapeutic standpoint, the new compounds are found to be advantageous for producing effects on the nervous system and simultaneously on the muscle apparatus of the smooth muscles as well as of the striated muscles. They influence certain functions of the central nervous system. Hence they are particularly suitable as such or in solution or in other compositions in medicinal remedies for the treatment of diseases of the nervous apparatus or of the muscle apparatus deriving from trouble in the nervous system.

Those compounds possessing an unsubstituted phenyl radical and in which the basic amino group is in the β- or γ-position of an ethane, or of a propane chain, the basic amino group being either the dimethylamino, diethylamino or piperidino group may be prepared from cheap and easily available starting materials and hence we prefer these compounds. From the therapeutic standpoint the dimethylamino and diethylamino compounds are particularly valuable, as are also the non-toxic inorganic and organic salts thereof.

It has been found that the new basic esters as defined in Formula I can be obtained by condensing 1-aryl-cycloalkyl-1-carboxylic acids of the general Formula II:

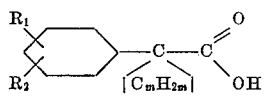

or their reactive, functional derivatives, with amino-alcohols of the general Formula III

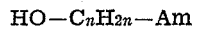

or their reactive, functional derivatives, whereby one of the two components must be present in the form of a reactive derivative containing a hydrosulfide- or substituted hydrosulfide-group (e. g., on the one hand as a monothio-carboxylic acid or a monothio-carboxylic acid-ester, or on the other hand, as a mercaptan).

Thus a 1-aryl-cyclopentane-1-carboxylic acid of the general Formula II, or a reactive functional derivative thereof, can be reacted with a basically substituted mercaptan of the general Formula IV:

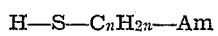

or with a metallic salt of the same, or, on the other hand, a monothiocarboxylic acid of the General Formula V:

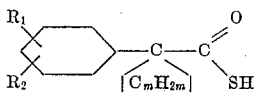

its esters or its salts may be reacted with a compound of the general Formula VI:

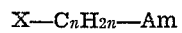

wherein X means a halogen atom, a hydroxyl- or a hydrosulphide group.

For purposes of illustration without however limiting the scope of the invention to this enumeration the following may be mentioned as a few of the many such reactions possible.

The acid chloride of a carboxylic acid of the general Formula II is treated with an amino-substituted mercaptan of the general Formula IV. In place of the acid chloride, another acid halide, the anhydride or the free acid (in the latter case an esterification catalyst can be added with advantage) may be allowed to react with the mercaptan. Instead of the free mercaptan, its metallic salts may also be employed.

A preferable method of carrying out the process is to bring the 1-aryl-cyclopentane-1-carboxylic acid-chloride and an equimolecular amount of the basic mercaptan together, either in the presence or the absence of inert organic solvents, such as ether, benzene, dioxane or acetone. The reaction takes place at room temperature, but more rapidly at higher temperatures. This method yields the hydrochloride of the new bases directly.

Furthermore, esters of carboxylic acids of the general Formula II especially phenyl esters undergo alcoholysis (ester-exchange) on heating with basically substituted mercaptans of the general Formula IV most suitably in the presence of catalysts, such as, for example, the corresponding sodium mercaptides.

1 - aryl - cyclopentane - 1 - monothio - carboxylic acids (V) and their salts react with halogen-substituted alkylamines of the general Formula VII $$Hal-C_nH_{2n}-Am \qquad VII$$

to yield, again, esters of the general Formula I. The same esters can also be obtained by esterifying 1 - aryl - cyclopentane -1- monothiocarboxylic acid with amino alcohols of the general Formula III and by alcoholysis (ester-exchange) of 1-aryl-cyclopentane-1-monothiocarboxylic-alkyl- or aryl esters with aminoalcohols of the general Formula III.

Another process makes use of the reaction between reactive esters, such as, for example, the hydrochloric-, sulphuric- or arylsulphonic acid esters of 1 - arylcyclopentane - 1 - monothiocarboxylic acid-hydroxy-alkyl-esters of the general Formula VIII:

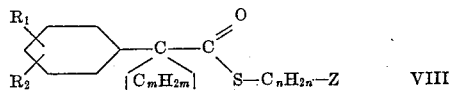

wherein Z means the group obtained on esterifying a hydroxyl group with hydrochloric-, sulphuric-, arylsulphonic- or similar acids, and secondary amines, of the general formula H—Am. When tertiary amines are used instead of secondary in this process, the quaternary salts of the basic esters having the general Formula I are obtained.

The esters of general Formula VIII required as starting materials for this process can be prepared, for example, by reacting salts of 1-arylcyclopentane-1-monothio-carboxylic acids with compounds of the general formula:

$$Halogen-C_nH_{2n}-Z$$

The new esters as defined in the general Formula I form salts with inorganic or organic acids, which salts are mostly soluble in water, while with reactive esters of aliphatic and araliphatic alcohols, as with alkyl halides, dialkyl sulphates or aralkyl halides, the new esters become converted to quaternary salts.

The following may be given as examples of monothiocarboxylic acids of the general Formula V: 1-phenyl-cyclopentane - 1-monothiocarboxyic acid, 1-(2′-tolyl)-cyclopentane - 1-monothiocarboxylic acid, as well as the isomeric 3′- and 4′- substituted compounds, 1-(3′,4′-dimethyl-phenyl)-cyclopentane-1-monothiocarboxylic acid and its isomers, 1-(2′-anisyl)-cyclopentane-1-monothiocarboxylic acid as well as the corresponding 3′- and 4′-substituted acids, 1-(3′,4′-dimethoxyphenyl)- cyclopentane - 1 - monothio-carboxylic acid, 1-(3′-methyl - 4′-methoxy-phenyl)- cyclopentane-1-monothiocarboxylic acid and similar compounds.

The following may be cited as examples of secondary aliphatic, cycloaliphatic and heterocyclic amines of the general Formula H—Am: Dimethyl-, diethyl-, dipropyl-, di-isopropylamine, di-allylamine, methyl-ethylamine, cyclopentyl-ethylamine, cyclohexyl-methylamine, piperidine, pyrrolidine, morpholine and similar compounds.

By $-C_nH_{2n}-$ is meant a bivalent, aliphatic hydrocarbon residue, e. g., $-CH_2-CH_2-$;

$$-CH_2-CH_2-CH_2-$$

$$-CH_2-CH_2-CH_2-CH_2-CH_2-CH_2-$$

$$-CH_2-CH-$$
$$\qquad |$$
$$\qquad C_2H_5$$

$$\qquad CH_3$$
$$\qquad |$$
$$-CH_2-C-CH_2-$$
$$\qquad |$$
$$\qquad CH_3$$

or $$-CH_2-CH-CH_2-CH_2-$$
$$\qquad |$$
$$\qquad CH_3$$

The following examples further expound and explain the invention, without however limiting the scope of the invention to these particular examples. Parts are given by weight and temperatures are in degrees centigrade. The melting points are corrected:

Example 1

1-phenyl-cyclopentane -1-monothio-carboxylic acid-β-diethyl-amino-ethylester-hydrochloride

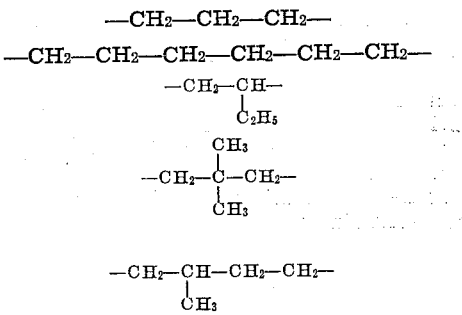

20.85 parts of phenylcyclopentane-carboxylic acid-chloride dissolved in 120 parts of absolute benzene are added dropwise while stirring to a solution of 26.6 parts of β-diethylamino-ethylmercaptan in 120 parts of absolute benzene, whereby the temperature rises to 30–40°. After boiling for a few minutes under reflux, followed by cooling with ice, the precipitate is filtered off under suction and washed with absolute benzene. The lumped benzene solutions are washed with water, dried and the benzene evaporated off. The residue boils at 122–123° at 0.05 mm. pressure and is the required base.

To prepare the hydrochloride, the base is dissolved in absolute ether and treated with the equivalent quantity of hydrogen chloride dissolved in ether. The salt which precipitates out is separated by filtration under suction. After re-crystallisation from acetic ester-methanol it melts at 138–140°.

This base also gives water-soluble salts with sulphuric-, phosphoric-, acetic-, citric- and maleic acids.

By heating the base with excess ethyl bromide the quaternary salt may be obtained in the form of colourless crystals, which readily dissolve in water, and show a M. P. of 175–176°.

The salt with ethane-α:β-disulfonic acid has a M. P. of 124–125°.

Example 2 ylic acid - β-diethylamino-ethylester-hydrochloride

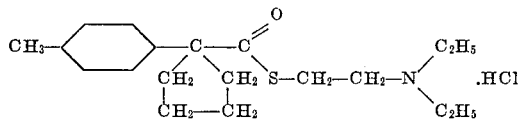

22.25 parts of 1-(p-tolyl)-cyclopentane-1-carboxylic acid-chloride dissolved in 25 parts of absolute benzene are added, while cooling with ice, to a solution of 19.0 parts of β-diethylamino-ethyl-mercaptan in absolute benzene. After the mixture has been allowed to stand for several hours, 10% aqueous caustic soda is added, and an ether extract made. The ether-benzene solution is washed with water and dried. After the solvent has been distilled off, the product remaining, which boils at 140–142° under 0.12 mm. pressure, is the required base. The hydrochloride of this base, prepared by the process described in Example 1, melts at 190–192°.

The following compounds, for example, can be prepared by the procedure described in Example 2: 1-(3',4'-dimethylphenyl)-cyclopentane-1-monothio-carboxylic acid-β-diethyl-amino-ethylester,

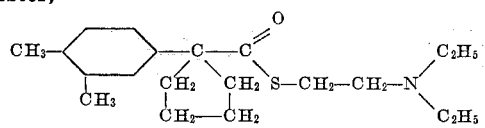

Boiling point of the base: 151–156° at 0.55 mm. pressure. Melting point of the hydrochloride: 167–168°.

1-(4'-methoxyphenyl)-cyclopentane-1-monothio-carboxylic acid-β-diethylamino-ethylester

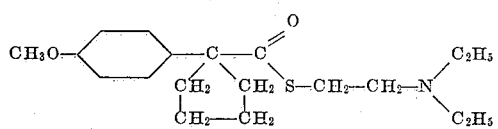

Boiling point of the base: 145–147° at 0.02 mm. pressure. Melting point of the hydrochloride: 176–178°.
Further:

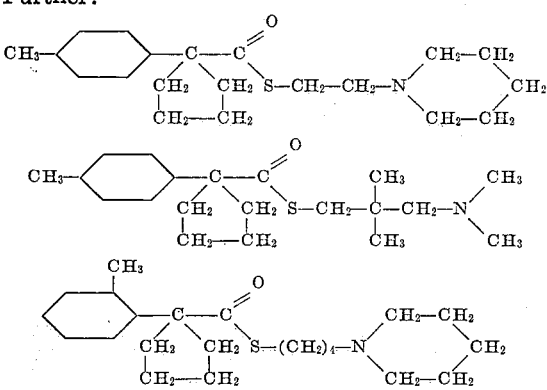

B. P. $_{0.12}$ 169–171°. Hydrochloride M. P. 155–157°.

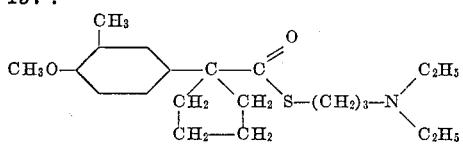

B. P. $_{0.1}$ 169–170°. Hydrochloride M. P. 135–136°.

Example 3

1-phenyl-cyclopentane-1-monothio-carboxylic-acid-γ-diethylamino-propylester-hydrochloride.

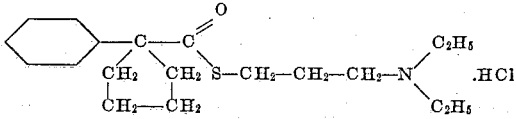

20.85 parts of 1-phenyl-cyclopentane-1-carboxylic acid-chloride dissolved in 100 parts of absolute benzene are added dropwise to a solution of 14.7 parts of γ-diethyl-amino-propyl-mercaptan in 100 parts of absolute benzene. A rise in temperature to 30–40° occurs. The reaction mixture is stirred for some time, then the benzene is distilled off and the residue recrystallised from a mixture of acetic ester and methanol. The hydrochloride of the required base is obtained directly in this way. It melts at 117–118°.

Another form of the same hydrochloride occasionally obtained on crystallisation from the same solvents melts at 137–138°.

The free base boils at 135–137° at 0.07 mm. pressure.

If 14.7 parts of β,β-dimethyl-γ-dimethylamino-propyl-mercaptan are used instead of 14.7 parts of γ-diethylamino-propyl-mercaptan, then the same process yields a hydrochloride of the formula:

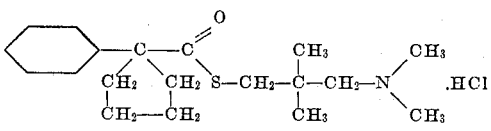

Example 4

1-phenyl-cyclopentane-1-monothio-carboxylic acid-β-dimethylamino-ethylester-hydrochloride

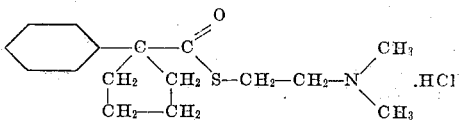

A solution of 20.85 parts of 1-phenyl-cyclopentane-1-carboxylic acid-chloride in 150 parts of absolute benzene is added dropwise, while stirring, to 10.5 parts of β-dimethylamino-ethyl-mercaptan dissolved in 150 parts of absolute benzene. The reaction mixture is then heated to boiling for 10 minutes, cooled and filtered under suction. The melting point of the hydrochloride of 1-phenyl-cyclopentane-1-monothio-carboxylic acid-β-dimethylamino-ethylester so obtained is 166–167°.

Example 5

1-phenyl-cyclopentane-1-monothio-carboxylic acid-β-piperidino-ethylester-hydrochloride

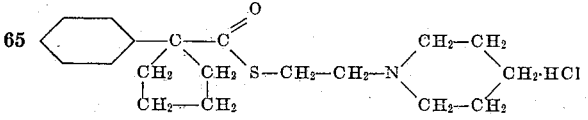

20.6 parts of 1-phenyl-cyclopentane-1-monothio-carboxylic acid (obtained by the action of hydrogen sulphide on phenyl-cyclopentane-carboxylic acid chloride in pyridine—melting point 116–117° after recrystallisation from acetone) are boiled for 18 hours with 16 parts of β-piperidino-ethyl-chloride and 20 parts of potassium carbonate (anhydrous) in 65 parts of dry acetone. After cooling and filtering, the solvent is distilled off and the residue itself distilled. The distillate is the base required. Boiling point 138–140° at 0.07 mm. pressure. The hydrochloride of this base melts at 187–188°.

If, instead of 16 parts of β-piperidino-ethylchloride, 16.2 parts of β-morpholino-ethylchloride, 24 parts of δ-di-ethylamino-butylbromide or 30 parts of ω-piperidino-hexyl-bromide are used, then the following esters are obtained by employing the same procedure:

[structural formula]

[structural formula]

Hydrochloride M. P.: 125–126°.

[structural formula]

Hydrochloride M. P.: 116–118°.

[structural formula]

Hydrochloride M. P.: 147–148°.

The procedures detailed in the above examples are capable of modification in many respects. Thus, other inert solvents may be used, e. g., ether, dioxane, petroleum distillates or other hydrocarbons. Furthermore, concentrations, reaction-temperatures and reaction-times may be varied within certain limits.

*Example 6*

1-phenyl-cyclopentane-1-thiocarboxylic acid-γ-diethyl-amino-propylester

[structural formula]

26.6 parts of 1-phenyl-cyclopentane-1-carboxylic acid-phenyl ester are heated, while excluding moisture, with 4.6 parts of metallic sodium and 73.5 parts of dry γ-diethyl-amino-propylmercaptan for 2 hours in the oil-bath at 120–130° (oil-bath temperature). The excess γ-diethylamino-propyl-mercaptan is then distilled off in vacuo (produced by a water-jet pump) and the residue, after cooling, taken up in ether. The ethereal solution is washed with water and extracted with dilute hydrochloric acid. The base is set free from the combined hydrochloric acid extracts with 10% caustic soda solution, taken up in ether and the ethereal solution dried with sodium sulfate. After the ether has been distilled off on the water-bath 1-phenyl-cyclopentane-1-thiocarboxylic-acid-γ-diethyl-aminopropyl-ester remains. It boils at 136–139° under 0.12 mm. pressure. The hydrochloride, which is prepared as in Example 1, melts at 137–138° after recrystallisation from acetic ester and methanol.

What we claim is:
1. Process for the manufacture of compounds suitable as medicinal remedies, comprising bringing into contact an acid chloride of the formula

[structural formula]

wherein Ar represents a mononuclear aromatic hydrocarbon radical with the equimolecular proportion of a basic mercaptan of the formula $$HS-C_nH_{2n}-Am$$

wherein Am represents the radical of a secondary amine containing from 2 to 5 carbon atoms selected from the group consisting of dialkylamino, piperidino, pyrrolidino and morpholino radicals and $n$ represents an integer from 2 to 6, and separating the hydrochloride of the resulting base by filtration.

2. A medicinal remedy comprising essentially

[structural formula]

a compound selected from the group consisting of the compounds of the formula

[structural formula]

wherein Ar represents a mononuclear aromatic hydrocarbon radical, Am represents the radical of a secondary amine containing from 2 to 5 carbon atoms selected from the group consisting of dialkylamino, piperidino, pyrrolidino and morpholino radicals and $n$ represents an integer from 2 to 6, and their water soluble salts.

3. A medicinal remedy comprising essentially a compound of the group consisting of

[structural formula]

and its hydrochloride.

4. A medicinal remedy comprising essentially a compound of the formula

[structural formula]

wherein R′ represents a straight chain aliphatic hydrocarbon radical containing 2 to 3 carbon atoms, R represents a member selected from the group consisting of methyl and ethyl radicals.

5. A medicinal remedy comprising essentially a water soluble salt of a compound of the formula

[structural formula]

wherein R′ represents a straight chain aliphatic hydrocarbon radical containing 2 to 3 carbon atoms, R represents a member selected from the group consisting of methyl and ethyl radicals.

6. A medicinal remedy comprising essentially a compound selected from the group consisting of

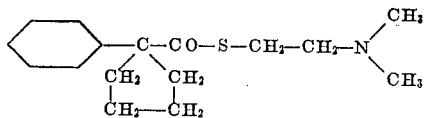

and its hydrochloride.

7. A medicinal remedy comprising essentially a compound selected from the group consisting of

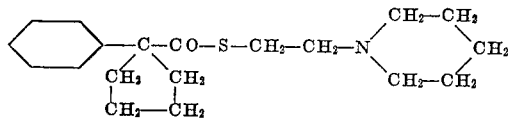

and its hydrochloride.

8. A medicinal remedy comprising essentially a compound selected from the group consisting of

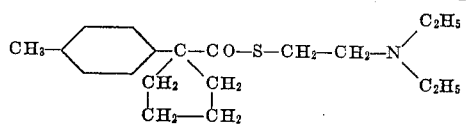

and its hydrochloride.

9. A medicinal remedy comprising essentially a compound selected from the group consisting of

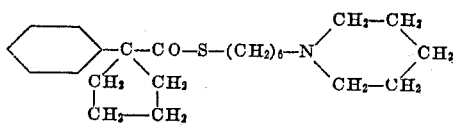

and its hydrochloride.

FRANZ HÄFLIGER.
HENRY MARTIN.
ROLF DENSS.

REFERENCES CITED

The following references are of record in the file of this patent:

UNITED STATES PATENTS

| Number | Name | Date |
|---|---|---|
| 2,079,962 | Miescher et al. | May 11, 1937 |
| 2,262,754 | Burtner | Nov. 18, 1941 |
| 2,390,555 | Richardson | Dec. 11, 1945 |
| 2,404,588 | Martin et al. | July 23, 1946 |
| 2,488,253 | Woodruff | Nov. 15, 1949 |

OTHER REFERENCES

Hansen et al.: "Jour. Am. Chem. Soc.," vol. 55 (1933), pp. 2872–74.

Clinton et al.: "Jour. Am. Chem. Soc.," vol. 68 (1946), pp. 2076–77.